INVENTOR.
CARL J. NARDON
BY
Lyon & Lyon
ATTORNEYS

INVENTOR.
CARL J. NARDON
BY Lyon & Lyon
ATTORNEYS

United States Patent Office 3,418,919
Patented Dec. 31, 1968

1

3,418,919
WAFFLE IRON CONSTRUCTION
Carl J. Nardon, 4532 Cockerham Drive,
Los Angeles, Calif. 90027
Filed Dec. 20, 1966, Ser. No. 603,286
5 Claims. (Cl. 99—378)

ABSTRACT OF THE DISCLOSURE

A novel heating element for placement in surface contact with the back face of a waffle iron grid comprising supporting beam means adapted to be mounted on the body of a waffle iron, an annular heating element ring, and a spring mounting between said beam and said heating element, said spring mounting comprising two spaced parallel flexible bodies each having a straight portion affixed to said beam, and at the end of each of said straight portions, vertical portions being adapted to abut the underside of said heating element for maintaining the upper face of said heating element in contact with the back face of the waffle iron grid during warping of said beam to provide for uniform heating of said grid.

---

This invention relates to a novel heating element structure for a waffle iron and to a waffle iron provided with the novel heating element structure.

Waffles are conventionally made by pouring the liquid batter onto a grid and enclosing the batter in a second grid whereafter the batter is baked under the pressure of the two grids at elevated temperature. Normally both the grids are provided with some type of heating element in order to raise the batter to its baking temperature and give the surface a hard crust. It is most desirable that the final waffle has a uniformity of crust thickness and brown appearance. The resulting waffle is more saleable and generally more palatable since it is pleasing to the eye and of uniform consistency throughout. However, it has been found that the various existing waffle iron structures having heating elements underlying the iron grids frequently do not uniformly heat the grid with the result that the waffles produced are unacceptable in color and composition. I have found that this is due to the fact that during the operation, the structure supporting the heating element tends to warp under the influence of the heat radiated against the support by the underside of the waffle iron grids. Since in the presently available structures the heating element is attached directly to the supporting structure, the warping of the supporting structure causes the heating element to be withdrawn at some point or points from the underside of the waffle iron grid. As a result, the waffle iron grid itself is not uniformly heated, but instead has various points thereon which are much cooler than others because of the lack of proximity of the heating element to the underside of the grid. This has been found to be the result in the lack of uniformity of the final waffle product as indicated above.

Accordingly, it is a principal object of the present invention to provide a novel heating element structure for placement in surface contact with a waffle iron grid.

More particularly, it is an object of the present invention to provide a novel heating element for use in a waffle iron grid whereby the upper face of the heating element remains in contact with the underside of the waffle iron grid during the warping of the supporting beam.

Still another object of the present invention is to provide a novel waffle iron having the novel heating element structure incorporated therein whereby waffles of more uniform composition and color can be consistently obtained.

2

In another aspect of the invention, it is an object thereof to provide a spring mounting connection between the heating element and the support beam of a waffle iron.

It is also an object of the present invention to provide a support beam for the heating element of a waffle iron which is fixably attached at one end to the body of the waffle iron and slidably mounted at the other end so that the beam can expand lengthwise with respect to the body of the waffle iron supporting it.

These and other objects and advantages of the present invention will be apparent from the more detailed description which follows taken in conjunction with the accompanying drawings in which.

Briefly, the present invention comprises a novel heating element for placement in surface contact with the backface of a waffle iron grid comprising supporting beam means adapted to be mounted on the body of the waffle iron, an annular heating element ring, and a spring mounting between said beam and said heating element whereby the upper face of the annular heating element can remain in contact with the back machine surface of the waffle iron grid during warping of the supporting beam to thereby maintain greater uniformity of heating on the operating surfaces of the grid. The invention additionally comprises a novel waffle iron containing the novel heating iron above described.

The invention also encompasses a novel heating element wherein the supporting beam is fixably attached to one end of the body of the waffle iron and slidably mounted at its other end so that the beam can expand lengthwise with respect to the body of the waffle iron to minimize warping and buckling of the beam.

Figure 1:
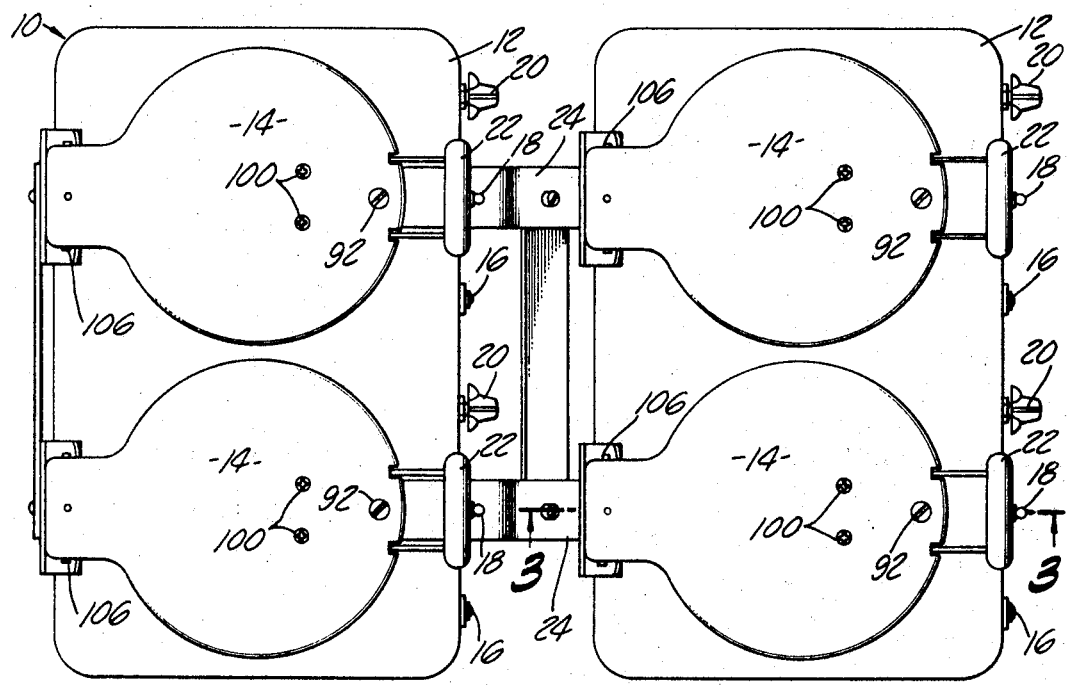
FIGURE 1 is a top view of two of the novel waffle irons of the present invention connected in tandem to permit the simultaneous production of up to four waffles.
Figure 2:
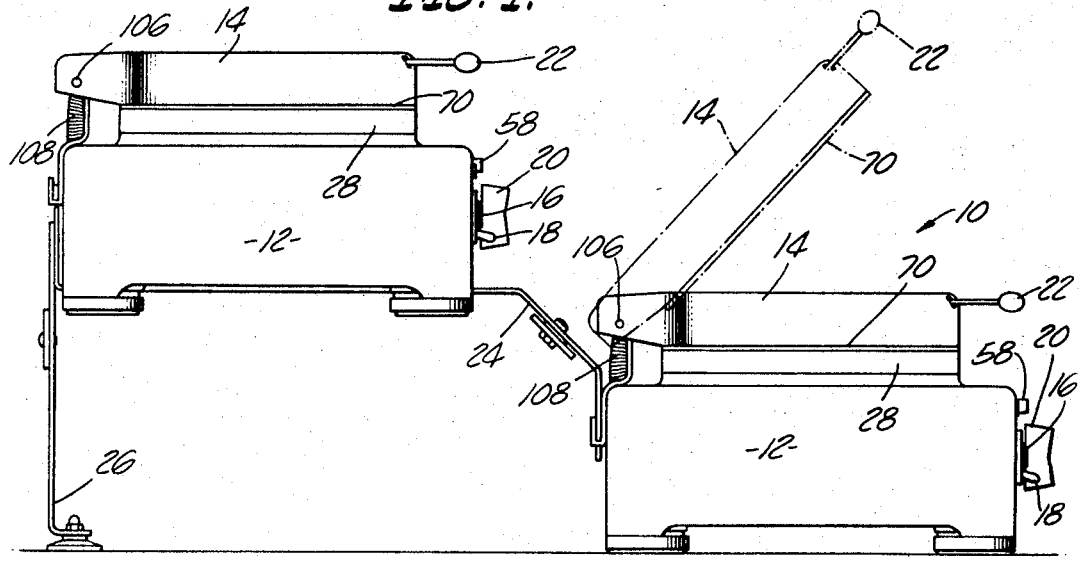
FIGURE 2 is a side view of the device shown in FIGURE 1.

The waffle iron of my invention is depicted generally in FIGURES 1 and 2. In these figures, the entire waffle iron units are indicated as 10, each having a body 12 with a hinge connection carrying covers 14 which may be raised and lowered as shown at the right side of FIGURE 2. The body 12 is provided with all of the usual waffle iron controls, including signal lights 16 to indicate when the waffle irons are hot, on-and-off switches 18 and timer control knobs 20. Each of the covers 14 is provided with a handle 22 for opening and closing to permit loading and unloading. The connection 24 and supports 26 for tandem arrangement are, of course, optional since the units can be used individually or arranged in any desired combination. Likewise, any individual unit may be equipped to simultaneously make any number of waffles.

Figure 3:
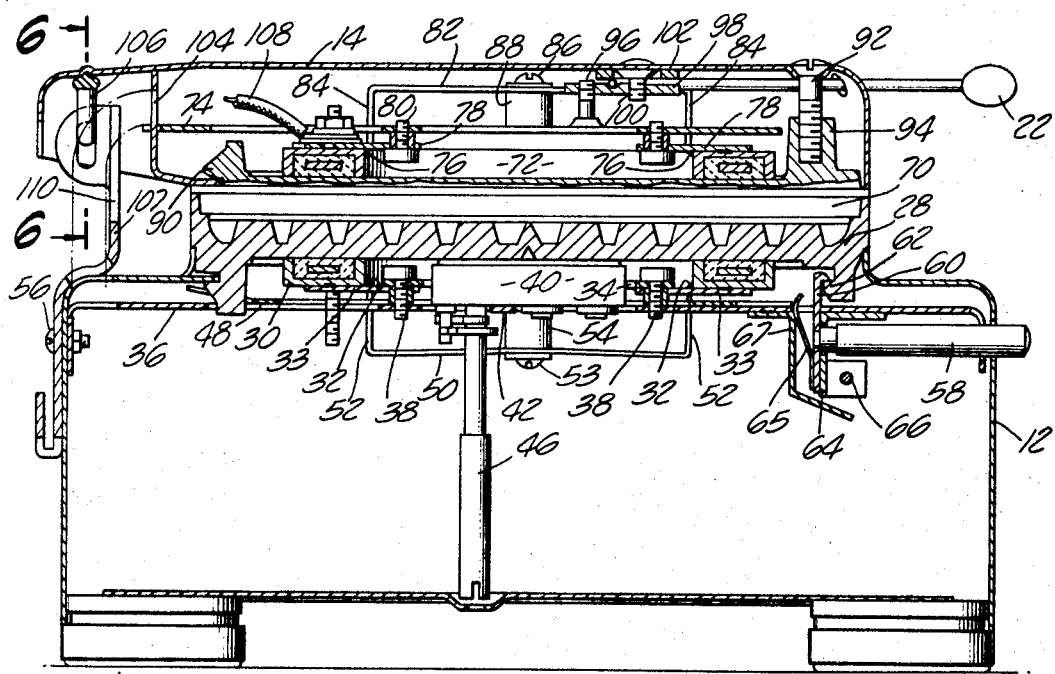
FIGURE 3 is a sectional view taken along the line 3—3 of FIGURE 1.
Figure 4:
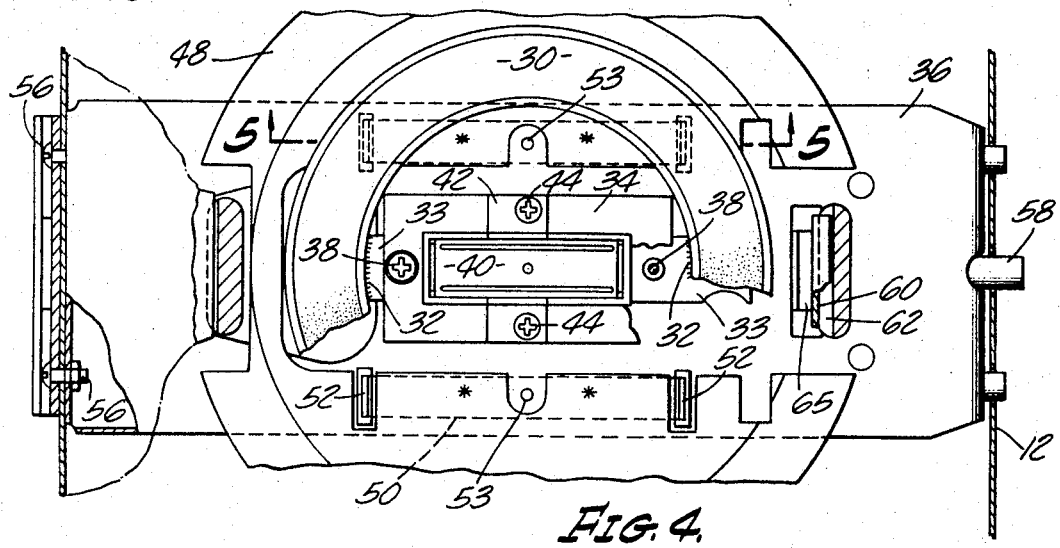
FIGURE 4 is a top view of the body portion of the waffle iron of this invention with the waffle iron grid removed and parts broken away and partially sectioned for clarity of illustration.
Figure 5:
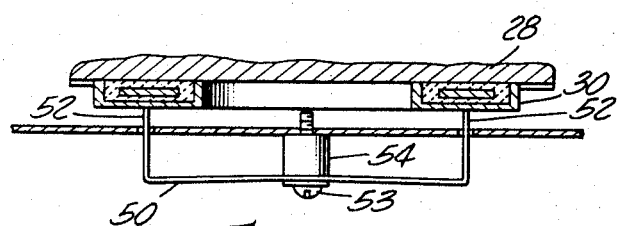
FIGURE 5 is a sectional view taken along the line 5—5 in FIGURE 4.

The particulars of the novel heating element of this invention are more fully shown in FIGURES 3 through 5. The lower waffle iron grid 28 in body 12 has on its machined underside in surface contact therewith the annular heating ring 30. The grid 28 is supported at each of its ends by body 12. The ring 30 is attached at two diametrically opposed points on its outer periphery by welds 32 to extensions 33 on rectangular center plate 34, which, in turn, is attached to transverse support beam 36 by screws 38. Also positioned inside center plate 34 is thermostat 40 carried by bracket 42 which is connected to center plate 34 by screws 44. The thermostat is operated by rotatable post 46 which can be reached through the bottom of body 12. The annular dished plate 48 is welded to beam 36 and generally underlies and encircles the ring 30.

Spring mounts for the ring 30 comprise two flexible metal springs 50 having vertical end portions 52 which abut the machined underside of waffle iron grid 28 at opposite sides thereof. The springs 50 are connected at their centers to transverse support beam 36 by screws 53 with spacing maintained by spacers 54. The beam 36 is connected directly to body 12 at one end by screws 56. At the other end, beam 36 is provided with a slide mounting to permit lengthwise expansion of the beam within the body 12. The slide mountings support pin 58, passes through the turn-down end portion of beams 36 and is attached to vertical plate 60 which is hinged to fixed plate 64 by pin 66. The top of plate 60 also serves to hold grid 28 in place. The grid 28 can be removed from body 12 for cleaning by pushing in on pin 58 which will remove plate 60 away from the appendage 62 on grid 28, thereby permitting the grid 28 to be lifted from body 12. Outward force on pin 58 is maintained by spring 65 operating between plate 60 and plate 67.

The cover 14 is equipped in a manner similar to body 12, having an upper grid 70 which is, of course, inverted with respect to grid 28. Above grid 70 is upper heating ring 72 attached to upper transverse support beam 74 by diametrically opposed welds 76 on connector 78. Connectors 78 are screwed to beam 74 by screws 80. The ring 72 is provided with spring mounts in the same general fashion as the lower ring 30. The mounts comprise two flexible metal springs 82 having vertical end portions 84 which abut the machined surface on the top of grid 70 at opposite sides thereof. The spring 82 are connected at their centers to transverse support beam 74 by screws 86 with spacing being provided by spacers 88. Grid 70 is held in place at one end by the lip 90 projecting inside cover 14. At the other end, grid 70 is retained by screw 92 passing through cover 14 into the up-standing end portion 94 of grid 70. Beam 74 is affixed by screws 96 to plate 98. The screws 100 and retainers 102, together with plate 98 hold the inner ends of handle 22. The other end of beam 74 is slidably received in slot 104 and lip 90 to permit lengthwise expansion of the beam 74.

Figure 6:
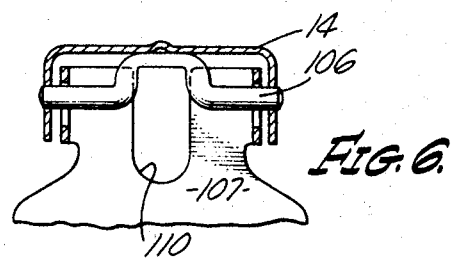
FIGURE 6 is a sectional view taken along the line 6—6 of FIGURE 3.

Turning to FIGURE 6 in greater detail, there is shown the hinge connection carrying cover 14. The hinge connection is provided with a U-shaped pin 106 passing through aligned holes in the upright hinge member 107 and cover 14. The holes in the cover 14 are large enough to permit rotation of cover 14 about pin 106. The U-shaped center section of pin 106 facilitates the passage of electric cord 108 through opening 110. The U-shaped center also restricts the sideways movement of the pin 106 in the hinge connection, obviating the need for heads or other retainers on the outside ends thereof.

In operation, when the heating rings 30 and 72 are heated by the passage of electric current therethrough, the transverse support beams 36 and 74 tend to warp. Normally, this would cause the rings to be partially withdrawn from contact with grids 28 and 70 resulting in a lack of uniform heating of the waffle. However, these problems are overcome in the present invention due to the operation of the spring mountings. The free ends of the springs 50 and 82 abut the underside of each of the heating range at 4 widely separated points. Since the springs 50 and 82 are attached to the beams 36 and 74 only at their centers, the abuting ends of the flexible springs are not drawn away from the heating rings. Instead, the springs prevent the heating rings from being withdrawn from surface contact with the underside of the grids due to vertical movement of any part of the beams. The warping and buckling of the beams per se is also reduced by this invention since in each case, the one end of the beam is free to expand lengthwise upon heating. The combination of mounting springs and free end mounting of the beams cooperate to maintain uniformity of temperature across the grids for an indefinite period of operation of the waffle iron.

As will be apparent to those skilled in the art, many modifications and variations are possible within the scope of the present invention without departing from the spirit thereof. Accordingly, all such equivalent structures and variations are intended to be included within the scope of this invention. Thus, the invention is to be limited only by the lawful scope of the appended claims.

I claim:

1. A novel heating element for placement in surface contact with the back face of a waffle iron grid comprising supporting beam means adapted to be mounted on the body of a waffle iron, an annular heating element ring, and a spring mounting between said beam and said heating element, said spring mounting comprising two spaced parallel flexible bodies each having a straight portion affixed to said beam, and at the end of each of said straight portions, vertical portions being adapted to abut the underside of said heating element for maintaining the upper face of said heating element in contact with the back face of the waffle iron grid during warping of said beam to provide for uniform heating of said grid.

2. A novel waffle iron comprising at least one waffle iron grid, in contact with the back face of said waffle iron, an annular heating element ring, a transverse supporting beam mounted on the body of said waffle iron, and a spring mounting between said beam and said heating element, said spring mounting comprising two spaced parallel flexible bodies, each having a straight portion affixed to said beam, and at the end of each of said straight portions, vertical portions being adapted to abut the underside of said heating element for maintaining the upper face of said heating element in contact with the back face of the waffle iron grid during warping of said beam to provide more uniform heating of said grid, said transverse beam being affixed at one end to said body of the waffle iron and slidably mounted at its other end to said body of waffle iron so that said beam can expand lengthwise with respect to said body.

3. A novel waffle iron comprising a body and a cover, each having one waffle iron grid, a first transverse supporting beam mounted on the body of said waffle iron, a heating element in said body, and a spring mounting between said first beam and said heating element, said spring mounting comprising two spaced parallel flexible bodies, each having a straight portion underlying said first beam and being affixed at its center to said first beam, and at the end of each of said straight portions, vertical portions projecting through said first beam and being adapted to abut the underside of said heating element, a second transverse supporting beam mounted in the cover of said waffle iron, a heating element in said cover, and a spring mounting between said second beam and said heating element in said cover, said spring mounting comprising two spaced parallel flexible bodies, each having a straight portion underlying said second beam and being affixed at its center to said second beam, and at the end of each of said straight portions, vertical portions projecting through said second beam and being adapted to abut the underside of said heating element in said cover, said springs in said body and said cover maintaining the faces of said heating elements in contact with the back face of said waffle iron grids during warping of said beams to provide more uniform heating of said grids.

4. A novel waffle iron comprising a body and a cover, each having one waffle iron grid, a first transverse supporting beam mounted on the body of said waffle iron, a heating element in said body, and a spring mounting between said first beam and said heating element, said spring mounting comprising two spaced parallel flexible bodies, each having a straight portion underlying said first beam and being affixed at its center to said first beam, and at the end of each of said straight portions, vertical portions projecting through said first beam and being adapted to abut the underside of said heating element, a second transverse supporting beam mounting in the cover of said waffle iron, a heating element in said cover, and a spring mounting between said second beam and said heating element in said cover, said spring mounting comprising two spaced parallel flexible bodies, each having a straight portion underlying said second beam and being affixed at its center to said second beam, and at the end of each of said straight portions, vertical portions projecting through said second beam and being adapted to abut the underside of said heating element in said cover, said springs in said body and said cover maintaining the faces of said heating elements in contact with the back face of said waffle iron grids during warping of said beams to provide more uniform heating of said grids, said first transverse beam being affixed at one end to said body and slidably mounted at its other end to said body, said second transverse beam being affixed at one end to said cover and slidably mounted at its other end to said cover so that said beams can each expand lengthwise with respect to said body and cover.

5. A novel waffle iron comprising a body and a cover, each having one waffle iron grid, a first transverse supporting beam mounted on the body of said waffle iron, an annular heating element ring in said body, and a spring mounting between said first waffle iron, and a spring mounting between said first beam and said heating element, said spring mounting comprising two spaced parallel flexible bodies, each having a straight portion underlying said first beam and being affixed at its center to said first beam, and at the end of each of said straight portions, vertical portions projecting through said first beam and being adapted to abut the underside of said heating element, a second transverse supporting beam mounting in the cover of said waffle iron, an annular heating element ring in said cover, and a spring mounting between said second beam and said heating element in said cover, said spring mounting comprising two spaced parallel flexible bodies, each having a straight portion underlying said second beam and being affixed at its center to said second beam and at the end of each of said straight portions, vertical portions projecting through said second beam and being adapted to abut the underside of said heating element in said cover, said springs in said body and said cover maintaining the faces of said heating elements in contact with the back face of said waffle iron grids during warping of said beams to provide more uniform heating of said grids, said first transverse beam being affixed at one end to said body and slidably mounted at its other end to said body, said second transverse beam being affixed at one end to said cover and slidably mounted at its other end to said cover so that said beams can each expand lengthwise with respect to said body and cover, each of said cover and body having hinge mountings thereon, a hinge pin connected to said hinge mountings through aligned holes in said mountings to permit rotation of said cover about said pin, said pin having a U-shaped center portion to restrict lateral movement of said pin in said mountings.

References Cited

UNITED STATES PATENTS

| | | | |
|---|---|---|---|
| 1,450,277 | 4/1923 | Brown et al. | 99—340 |
| 1,613,770 | 1/1927 | Reichold | 219—525 |
| 1,661,294 | 3/1928 | Lemaster. | |
| 1,682,384 | 8/1928 | Lambert | 99—378 XR |
| 1,694,981 | 12/1928 | Randolph | 99—378 |
| 1,705,727 | 3/1929 | Forshee | 219—525 XR |
| 1,822,314 | 9/1931 | Reichold | 99—378 |
| 2,040,369 | 5/1936 | Fischer | 99—340 |
| 2,230,728 | 2/1941 | Propernick | 99—372 XR |
| 2,308,091 | 1/1943 | McCullough | 99—378 XR |
| 3,327,966 | 6/1967 | Jasionowski. | |

FOREIGN PATENTS

| | | |
|---|---|---|
| 1,040,598 | 5/1953 | France |
| 1,388,977 | 1/1965 | France. |

BILLY J. WILHITE, *Primary Examiner.*

U.S. Cl. X.R.

99—374, 379, 380; 219—525, 436, 467